Sept. 27, 1938.   W. A. SCHULZE   2,131,525
SEPARATING TREATING SOLUTIONS FROM PETROLEUM OILS
Filed April 25, 1935
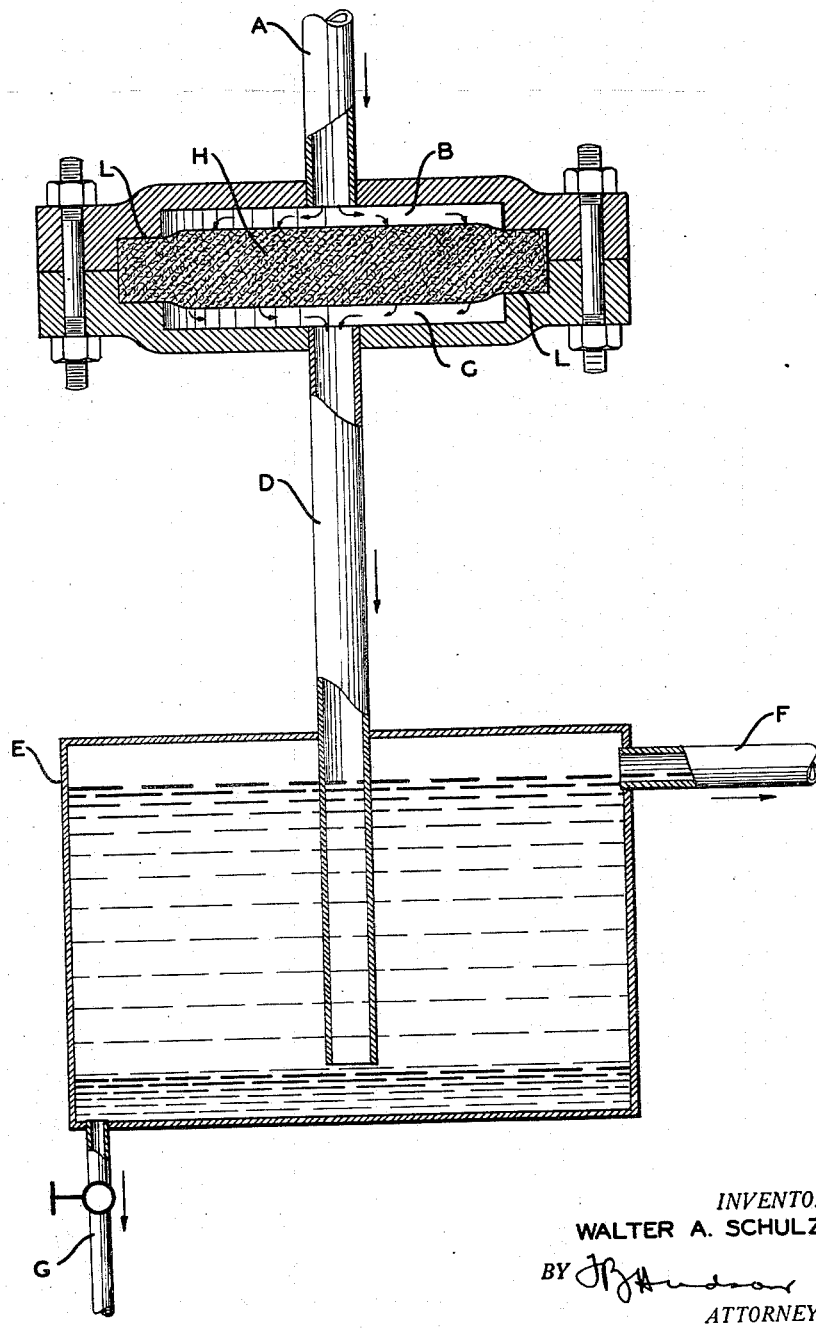
INVENTOR.
WALTER A. SCHULZE
BY
ATTORNEYS.

Patented Sept. 27, 1938

2,131,525

UNITED STATES PATENT OFFICE 2,131,525

SEPARATING TREATING SOLUTIONS FROM PETROLEUM OILS

Walter A. Schulze, Bartlesville, Okla., assignor to Phillips Petroleum Company, Bartlesville, Okla., a corporation of Delaware Application April 25, 1935, Serial No. 18,224

1 Claim. (Cl. 196—30)

This invention relates to the separation of aqueous treating agents from hydrocarbon oils. In a more specific sense it refers to the coagulation of the fine drops of treating solution which remain in suspension in the oil following contact between the oil and treating solution.

When petroleum oils are strongly agitated with substantially immiscible aqueous solutions and are then allowed to settle it is noticed that the oil usually remains quite cloudy for at least several hours and often several days, the cloudiness being due to fine drops of treating solution which settles very, very slowly. The rate of settling varies somewhat with the nature of the treating solution and the method of contacting and is mainly dependent on the differences in densities of the oil and treating solution, on the viscosity of the oil and on the temperature. An object of this invention is to remove this suspended treating agent substantially completely within a very limited time.

It is to be understood that reference is made herein to fine drops of treating agents which due to their small size and weight have not had sufficient time to completely settle out of the oil. There is no connection whatever between this type of droplet and that of an emulsion. Complete settling of the treating solution would be obtained if more time were allowed whereas the water in oil and other types of emulsions are stable and the water does not settle out merely on standing. The object of this invention is to shorten greatly the time required for settling of the very reactive treating agent, in order that undesirable reactions may be avoided.

When sour petroleum oils are sweetened with copper solutions as described in my Patent Number 1,964,219, issued June 26, 1934, it has been found that under certain conditions fine drops of copper chloride solution remain suspended in the oil for so long a time as to cause some undesirable oxidation of compounds other than mercaptans. Rapid removal of the treating solution from the oil is therefore essential. I have discovered that substantially complete removal of the copper treating solution from the oil can be effected within a very short time after contacting by the method as described herein.

I have found that the fine droplets of copper solution can be gathered together into large drops by passing the oil through a filter packed with hair felt. The hair felt is packed sufficiently tight that a small pressure drop is maintained in the filter. This filtering material is preferentially wet with water and when the oil carrying the fine drops of aqueous treating solution is passed through the filter the treating solution adheres to the hair and is released in a coalesced state when sufficient liquid accumulates in the pad that no more aqueous solution will be retained by it under the conditions of operation. In practice the changes which are observed in the filtration step are as follows. The gasoline and copper solution are contacted and allowed to settle for a few minutes. In one method of operation the gasoline layer, still cloudy with suspended treating solution is passed downward through the hair filter. Following the filter, the gasoline is perfectly clear and it is noted that large drops of treating solution fall off the bottom of the filter and settle immediately by virtue of gravity into a sump prepared for this purpose. In one test it was found that one part of treating solution was separated in this way from 5,000 parts of gasoline. It is obvious that smaller or greater quantities can be removed, in each case an oil substantially free of suspended treating solution being obtained.

Various filtering devices and filtering materials are, of course, known to the art but none of these means can be used in conjunction with the copper chloride solution. Metallic filters and packings obviously cannot be used with the copper chloride solution because of the extremely corrosive property of the solution. Such substances as ordinary asbestos, "Alundum", glass wool and rock wool are inadequate in the copper solution because of either reaction with the solution, the lack of sufficient mechanical strength or insufficient preferential wetting with the solution. The discovery that hair felt can be used for this purpose whereas all the previously known materials are inoperative represents a considerable advance in the art.

In order to put my discovery into practice I have devised the apparatus shown in Figure 1 which illustrates in a diagrammatic manner a preferred method of operation. Various other designs and means of using this hair felt in a filtering process are, of course, possible and lie within the limits of the present invention.

In Figure 1 the pad of hair felt is inserted between a pair of recessed plates and compressed tightly between the surfaces labeled L by bolting the flanges together. This prevents the oil from passing around the edges of the pad rather than through it. In operation the petroleum oil containing the copper solution suspended therein passes through the pipe A into the filter and spreads into the space B above the hair felt. It then passes through the pad H where the suspension of copper solution is coalesced, thence into the space C below the pad and into the line D. The clear oil and the large drops of treating solution empty from D into the sump or tank E and the oil overflows at F. The treating solution is removed intermittently through a connection G in the bottom of the tank. A support may be placed in the spaces B and C if such support is needed to maintain the hair felt pad in adequately packed position.

It has been found that these hair filters will operate over long periods without any appreciable change taking place, providing, of course, that the stream being treated is free of solids which would collect on the filter. If solids are present they can first be removed by means of porous plates or some other well known methods. Such methods, however, will not remove the fine droplets of treating solution.

If the oil is subjected to a water washing step immediately following its contact with the copper solution, then the hair filter can be used, of course, to coagulate the remaining traces of water and/or diluted copper solution.

The term hair felt as used herein is meant to include the various kinds of animal hair which are of suitable size and mechanical strength for use in filters.

I claim as my invention:

In the process of sweetening oils with aqueous copper chloride solutions, the step of rapidly removing suspended droplets of solution from the treated oil, comprising passing said oil through a hair felt filter, whereby the suspended droplets are coalesced, and separating the coalesced droplets from the filtered oil.

WALTER A. SCHULZE.